United States Patent
Bruvold et al.

(10) Patent No.: US 12,466,086 B2
(45) Date of Patent: Nov. 11, 2025

(54) ROBOTIC END EFFECTORS FOR TEMPLATING FASTENERS AND RELATED SYSTEMS AND METHODS

(71) Applicant: The Boeing Company, Arlington, VA (US)

(72) Inventors: Benjamin R. Bruvold, Newcastle, WA (US); Torrin R. Girard, Puyallup, WA (US); Anna J. Rider, Mukilteo, WA (US); Elizabeth A Black, Helena, MT (US)

(73) Assignee: The Boeing Company, Arlington, VA (US)

( * ) Notice: Subject to any disclaimer, the term of this patent is extended or adjusted under 35 U.S.C. 154(b) by 222 days.

(21) Appl. No.: 18/528,563

(22) Filed: Dec. 4, 2023

(65) Prior Publication Data

US 2025/0178211 A1    Jun. 5, 2025

(51) Int. Cl.
  *B25J 15/00* (2006.01)
  *B25J 11/00* (2006.01)
  *B25J 13/08* (2006.01)
  *B25J 15/06* (2006.01)

(52) U.S. Cl.
  CPC ......... *B25J 15/0019* (2013.01); *B25J 11/005* (2013.01); *B25J 13/088* (2013.01); *B25J 15/0658* (2013.01)

(58) Field of Classification Search
  CPC .. B25J 15/0019; B25J 15/0658; B25J 11/005; B25J 13/088
  See application file for complete search history.

(56) References Cited

U.S. PATENT DOCUMENTS

| | | | |
|---|---|---|---|
| 1,590,578 | A | 6/1926 | Harris et al. |
| 3,711,006 | A | 1/1973 | Conner |
| 4,662,556 | A | 5/1987 | Gidlund |
| 4,736,519 | A | 4/1988 | Roberts |

(Continued)

FOREIGN PATENT DOCUMENTS

| | | |
|---|---|---|
| DE | 517372 C | 2/1931 |
| DE | 3822435 A1 | 1/1990 |

(Continued)

OTHER PUBLICATIONS

European Patent Office, Extended European Search Report in related App. No. EP24162325.5, Aug. 29, 2024.

*Primary Examiner* — Moshe Wilensky
(74) *Attorney, Agent, or Firm* — Kolitch Romano Dascenzo Gates LLC

(57) ABSTRACT

End effectors comprise a housing, a positioner, and a translator. The positioner is supported by the housing and is configured to sequentially receive fasteners from a source of fasteners into a receiving position and sequentially move fasteners from the receiving position to a deploying position. The translator is supported by the housing relative to the positioner and is configured to sequentially translate fasteners from the deploying position to ports of a fastener holder. Robotic methods comprise sequentially receiving fasteners from a source of fasteners into a receiving position, sequentially moving fasteners from the receiving position to a deploying position, and sequentially translating fasteners from the deploying position to ports of a fastener holder.

20 Claims, 6 Drawing Sheets

(56) References Cited

U.S. PATENT DOCUMENTS

| | | | |
|---|---|---|---|
| 4,762,261 A | 8/1988 | Hawly et al. | |
| 4,854,491 A | 8/1989 | Stoewer | |
| 4,885,836 A | 12/1989 | Bonomi et al. | |
| 5,214,837 A | 6/1993 | Stafford | |
| 5,611,130 A | 3/1997 | Rummell et al. | |
| 6,172,374 B1 | 1/2001 | Banks et al. | |
| 6,237,212 B1 | 5/2001 | Speller, Jr. et al. | |
| 6,428,452 B1 | 8/2002 | Dahlstrom et al. | |
| 7,805,829 B2 | 10/2010 | Herrmann et al. | |
| 10,981,277 B2 | 4/2021 | Pringle, IV et al. | |
| 10,987,767 B2 | 4/2021 | Pringle, IV et al. | |
| 11,673,182 B2* | 6/2023 | Eusterwiemann | B21J 15/02 29/524.1 |
| 2016/0008869 A1 | 1/2016 | Oberoi et al. | |
| 2019/0168388 A1 | 6/2019 | Pringle, IV et al. | |
| 2020/0189047 A1 | 6/2020 | Pringle, IV et al. | |
| 2022/0241842 A1* | 8/2022 | Galvin | B21J 15/025 |

FOREIGN PATENT DOCUMENTS

| | | | |
|---|---|---|---|
| DE | 4320282 A1 | 12/1994 | |
| FR | 2722437 A1 | 1/1996 | |
| GB | 191327049 A | 5/1914 | |
| JP | H05084685 A | 4/1993 | |
| JP | H09266613 A | 10/1997 | |
| JP | 2008183637 A | 8/2008 | |

* cited by examiner

ROBOTIC END EFFECTORS FOR TEMPLATING FASTENERS AND RELATED SYSTEMS AND METHODS

FIELD

The present disclosure relates to robotic end effectors for templating fasteners.

BACKGROUND

Manufacturing of large assemblies, such as aircraft, may require installation of thousands of fasteners. Often, fasteners are held by templates for easy access by manufacturing technicians and to ensure that a proper size and configuration of fastener is readily available at an appropriate location. However, preparing the templates (i.e., placing the fasteners in the templates) is very time consuming and requires repetitive arm and hand movements.

SUMMARY

Robotic end effectors, systems, and methods are disclosed herein. End effectors comprise a housing, a positioner, and a translator. The positioner is supported by the housing and is configured to sequentially receive fasteners from a source of fasteners into a receiving position and to sequentially move fasteners from the receiving position to a deploying position. The translator is supported by the housing relative to the positioner and is configured to sequentially translate fasteners from the deploying position to ports of a fastener holder. Systems comprise a plurality of end effectors, with each end effector being configured to work with a distinct size and/or configuration of fastener. Methods comprise sequentially receiving fasteners from a source of fasteners into a receiving position, sequentially moving fasteners from the receiving position to a deploying position, and sequentially translating fasteners from the deploying position to ports of a fastener holder.

DESCRIPTION

End effectors 10 for templating fasteners are disclosed herein. Generally, in FIG. 1, elements that are likely to be included in a given example are illustrated in solid lines, while elements that are optional to a given example or that correspond to a specific example are illustrated in broken lines. However, elements that are illustrated in solid lines are not essential to all examples of the present disclosure, and an element shown in solid lines may be omitted from a particular example without departing from the scope of the present disclosure.

Figure 1:
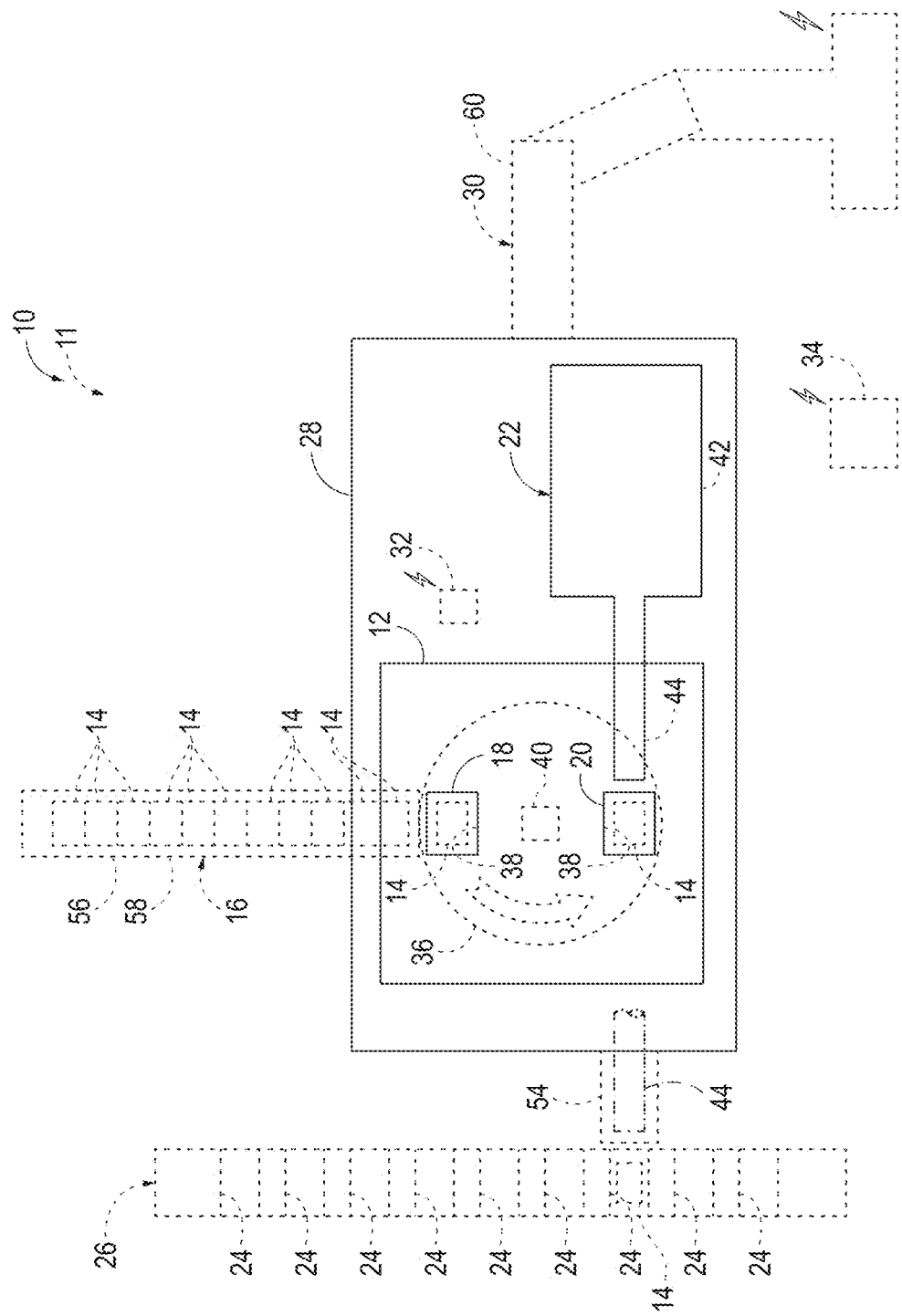
FIG. 1 is a schematic illustration representing end effectors and systems according to the present disclosure.

As schematically represented in FIG. 1, end effectors 10 generally comprise at least a housing 28, a positioner 12, and a translator 22. The positioner 12 is supported by the housing 28 and is configured to sequentially receive fasteners 14 from a source 16 of fasteners 14 into a receiving position 18 and sequentially move fasteners 14 from the receiving position 18 to a deploying position 20. The translator 22 is supported by the housing 28 relative to the positioner 12 and is configured to sequentially translate fasteners 14 from the deploying position 20 to ports 24 of a fastener holder 26, which also may be referred to as a fastener template. In some examples, the housing 28 is configured to be operatively coupled to a robotic manipulator 30 for automation of the insertion of fasteners 14 into fastener holders 26. Various robotic manipulators 30 may be used, including robotic arms, articulated robots, so-called cobots 60 (collaborative robots), delta robots, and other configurations of robots.

As schematically represented in FIG. 1, some end effectors 10 further comprise a sensor 32 that is supported by the housing 28 and that is configured to detect the presence of a fastener 14 in the receiving position 18. For example, the sensor 32 may be a distance sensor, a proximity sensor, or any other suitable sensor capable of detecting the presence of a fastener 14 in the receiving position 18.

Some end effectors 10 further comprise or may be associated with a controller 34 that is configured to operatively control the positioner 12 and the translator 22. The controller 34 may be any suitable device or devices that are configured to perform the functions of the controller 34 discussed herein. For example, the controller 34 may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure. In FIG. 1, lightning bolts associated with the robotic manipulator 30, the sensor 32, and the controller 34 schematically represent signals and/or other communication. Such communication may be wired or wireless.

In some examples, the controller 34 is configured to receive a signal from the sensor 32 indicating the presence of a fastener 14 in the receiving position 18. In such examples, the controller 34 is configured to operate the positioner 12 upon receipt of the signal from the sensor 32, and the controller 34 is configured to operate the translator 22 following operation of the positioner 12. Accordingly, the positioner 12 will only operate (i.e., attempt to move a fastener 14 from the receiving position 18 to the deploying position 20) when a fastener 14 is detected as being present in the receiving position 18.

In some examples and as schematically illustrated in FIG. 1, the positioner 12 comprises a rotatable structure 36 and a motor 40 (e.g., a stepper motor). The rotatable structure 36 defines a plurality of channels 38, with each channel 38 being configured to receive a fastener 14 and sequentially define the receiving position 18 and the deploying position 20. The motor 40 is operatively coupled to the rotatable structure 36 and is configured to selectively rotate the rotatable structure 36. Accordingly, the rotatable structure 36 receives a fastener 14 in a channel 38 defining the receiving position 18 and then rotates to operatively position the fastener 14 in the deploying position 20. Any number of channels 38 may be provided, including two, three, four, or more than four channels 38, which may be generally evenly spaced about the rotatable structure 36. The motor 40 therefore is configured to selectively rotate the rotatable structure 36 a corresponding angle (e.g., 180°, 120°, 90°, or so forth), such as responsive to a command from the controller 34 and responsive to receipt of a signal from the sensor 32.

As schematically illustrated in FIG. 1, in some examples of end effectors 10, the translator 22 comprises a linear actuator 42 that is supported by the housing 28, that is aligned with the deploying position 20, and that is configured to sequentially and linearly translate fasteners 14 away from the deploying position 20 and toward a port 24 of a fastener holder 26. Examples of linear actuators 42 include pneumatic actuators and hydraulic actuators, which sometimes are referred to as pneumatic cylinders and hydraulic cylinders.

Figure 2:
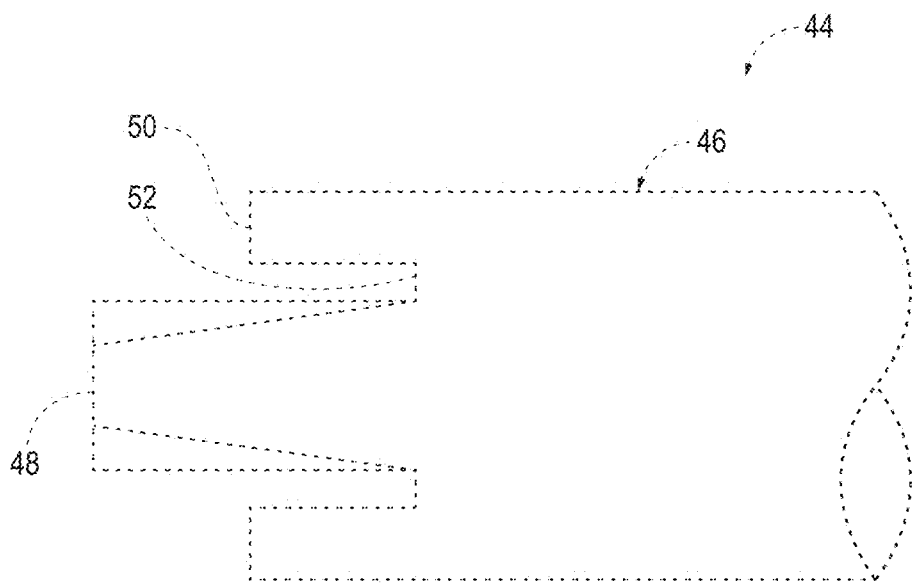
FIG. 2 is a schematic illustration representing example inserters of translators of end effectors according to the present disclosure.
Figure 3:
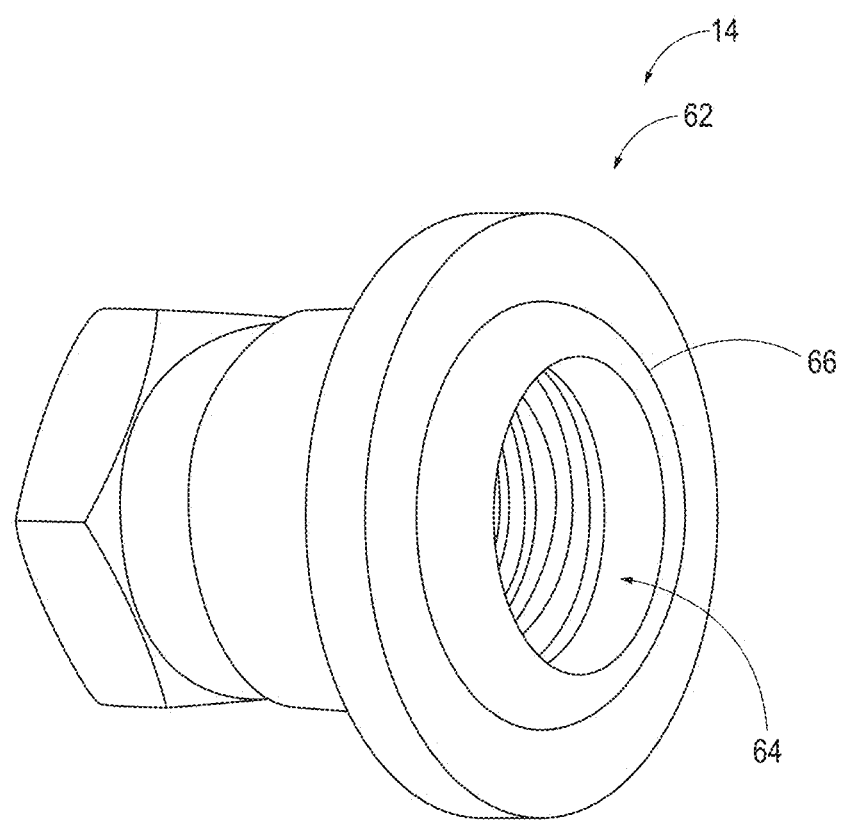
FIG. 3 illustrates an example fastener in the form of a collar nut.

In some examples, the translator 22 comprises an inserter 44 that is configured to operatively engage and mate with a fastener 14 in the deploying position 20. The inserter 44 may take various forms and structures such that it is configured to be operatively translated by the translator 22 to engage a fastener 14 in the deploying position and insert the fastener 14 into a port 24 of a fastener holder 26. In particular, the inserter 44 may be configured to engage and mate with a particular configuration of fastener 14, such as a collar nut. With reference to the schematic illustration of a portion of an inserter 44 in FIG. 2, in some examples, the inserter 44 comprises an end region 46 that is configured to operatively engage and mate with a fastener 14 in the deploying position 20, and the end region 46 comprises an elongate tip 48 and a rim 50 that extends circumferentially around the elongate tip 48. The elongate tip 48 and the rim 50 define a circumferential channel 52 between the elongate tip 48 and the rim 50. In some examples, the elongate tip 48 is frustoconical, and in some examples, the elongate tip 48 extends beyond the rim 50. Accordingly, such a configured inserter 44 may configured for use with collar nuts 62, an example of which is illustrated in FIG. 3. In particular, the elongate tip 48 of such an inserter 44 extends into the internal passage 64 of the collar nut 62 and with the collar nut's gasket 66 being received within the circumferential channel 52 of the inserter 44, such that the gasket 66 does not engage the inserter 44 at all. Accordingly, the integrity of the gasket 66 is not damaged or otherwise compromised in any way when the collar nut 62 is engaged and translated by the inserter 44.

With continued reference to the schematic illustration of FIG. 1, some end effectors 10 further comprise an insertion guide 54 that is supported by the housing 28, that is aligned with the deploying position 20, and that is configured to operatively guide a fastener 14 into a port 24 of the fastener holder 26. As an example, the insertion guide 54 may be a hollow cylinder or other tube that is appropriately shaped to permit operative translation of a fastener through the insertion guide 54. The insertion guide 54 may extend from the housing 28 to engage or otherwise be placed in close proximity to a fastener holder 26 without the housing 28 and the remainder of the end effector 10 coming into contact or otherwise interfering with the fastener holder 26.

In some examples of end effectors 10, the source 16 of fasteners 14 comprises a gravity-fed cartridge 56 that is supported by the housing 28, or that it configured to be selectively supported by the housing 28, to deliver fasteners 14 to the receiving position 18. In particular, the gravity-fed cartridge may have an internal cross-sectional shape that corresponds to a particular fastener configuration, such as a collar nut, so that the fasteners 14 can only be inserted into the gravity-fed cartridge in a desired orientation for delivery to the receiving position 18.

In other examples, the source 16 of fasteners 14 comprises a pneumatic feed system 58 that is coupled to the housing 28, or that is configured to be selectively coupled to the housing 28, and that is configured to pneumatically deliver fasteners 14 to the receiving position 18. Other configurations of sources 16 also are within the scope of the present disclosure.

Also within the scope of the present disclosure are systems 11 that comprise a plurality of the end effectors 10, with each end effector 10 of the plurality of end effectors 10 being configured to work with a distinct size and/or configuration of fastener 14. For example, a manufacturing facility may utilize distinct end effectors 10 for templating distinct configurations of fasteners 14 in multiple configurations of fastener holders 26.

Figure 4:
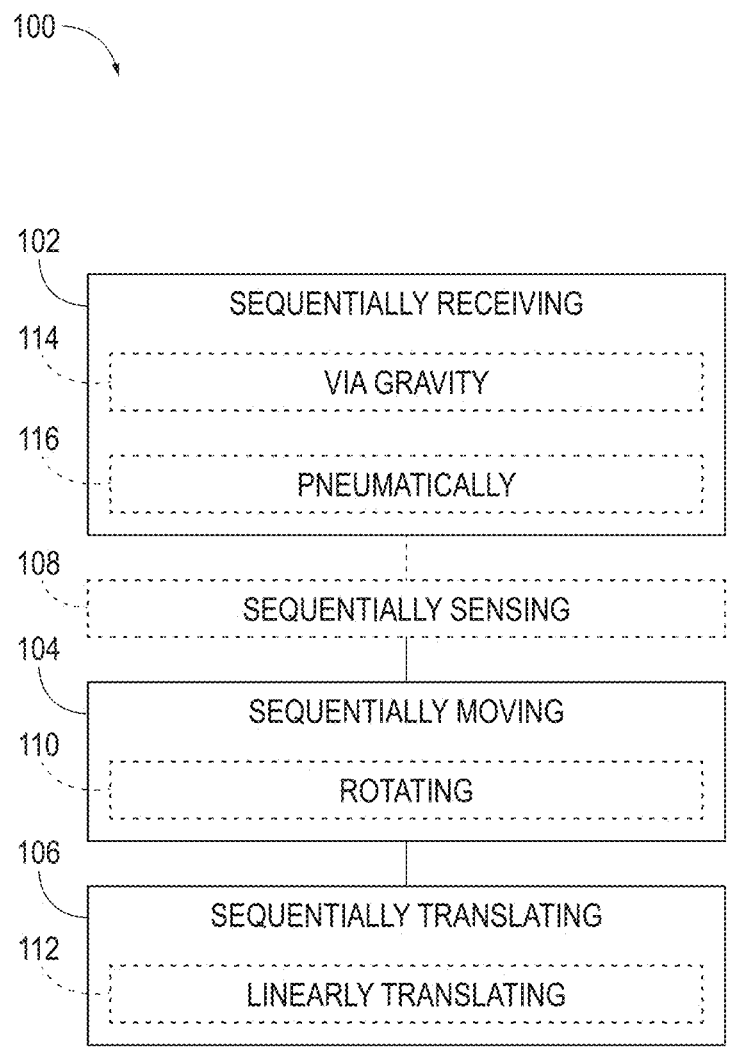
FIG. 4 is a flowchart schematically representing methods according to the present disclosure.

FIG. 4 schematically provides a flowchart that represents illustrative, non-exclusive examples of robotic methods 100 according to the present disclosure. In FIG. 4, some steps are illustrated in dashed boxes indicating that such steps may be optional or may correspond to an optional version of a robotic method 100 according to the present disclosure. That said, not all robotic methods 100 according to the present disclosure are required to include the steps illustrated in solid boxes. The robotic methods 100 and steps illustrated in FIG. 4 are not limiting and other methods and steps are within the scope of the present disclosure, including methods having greater than or fewer than the number of steps illustrated, as understood from the discussions herein.

With reference to FIG. 4 and also to FIG. 1 and the example end effectors 10 represented therein, robotic methods 100 comprise at least sequentially receiving 102 fasteners 14 from a source 16 of fasteners 14 into a receiving position 18, sequentially moving 104 fasteners 14 from the receiving position 18 to a deploying position 20, and sequentially translating 106 fasteners 14 from the deploying position 20 to ports 24 of a fastener holder 26.

Some robotic methods 100 further comprise sequentially sensing 108 the presence of fasteners 14 in the receiving position 18, such that the sequentially moving 104 is performed responsive to the sequentially sensing 108.

In some examples of robotic methods 100, the sequentially moving 104 comprises rotating 110.

In some examples of robotic methods 100, the sequentially translating 106 comprises linearly translating 112.

In some examples of robotic methods 100, the sequentially receiving 102 comprises receiving via gravity 114, such as via a gravity-fed cartridge 56.

In some examples of robotic methods 100, the sequentially receiving 102 comprises pneumatically receiving 116, such as via a pneumatic feed system 58.

Figure 5:
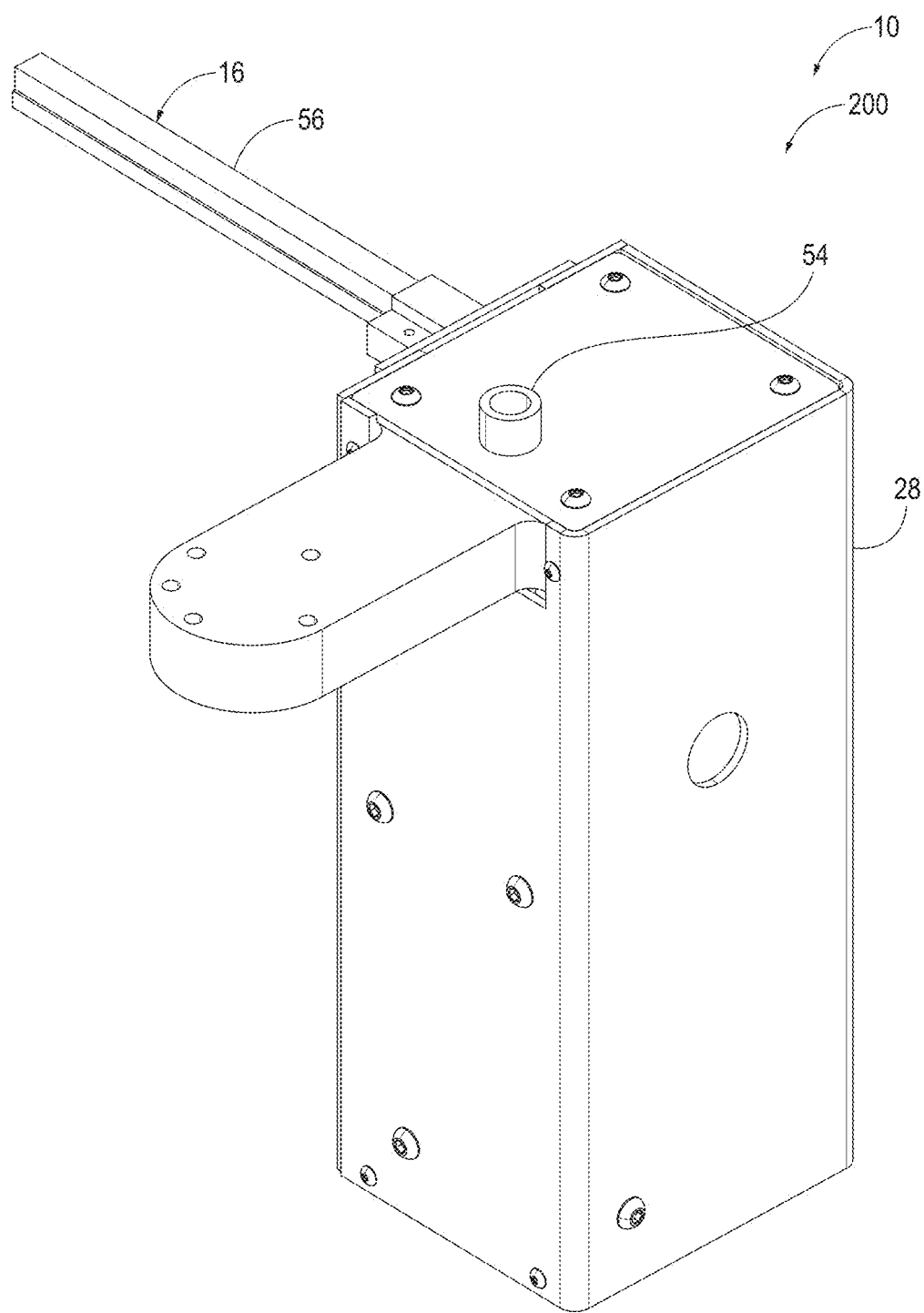
FIG. 5 is an isometric view of an example end effector according to the present disclosure.
Figure 6:
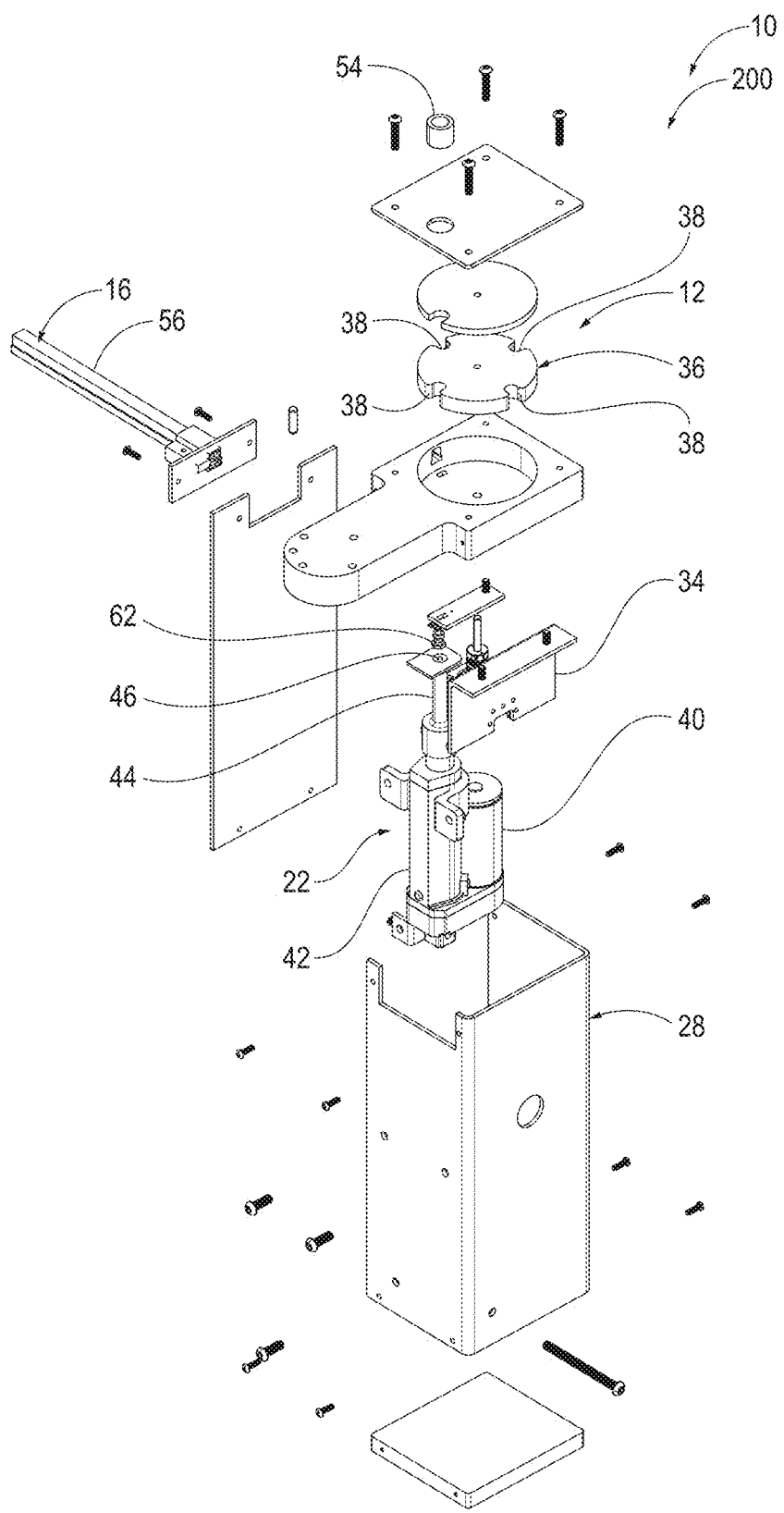
FIG. 6 is an isometric exploded view of the end effector of FIG. 5.

Turning now to FIGS. 5 and 6, an illustrative non-exclusive example of an end effector 10 in the form of an end effector 200 is illustrated. Where appropriate, the reference numerals from the schematic illustration of FIG. 1 are used to designate corresponding parts of the end effector 200; however, the example of FIGS. 5 and 6 is non-exclusive and does not limit end effectors 10 to the illustrated embodiment of the end effector 200. That is, end effectors 10 are not limited to the specific embodiment of the illustrated end effector 200, and end effectors 10 may incorporate any number of the various aspects, configurations, characteristics, properties, etc. of end effectors 10 that are illustrated in and discussed with reference to the schematic representations of FIGS. 1-3 and/or the embodiment of FIGS. 5 and 6, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the end effector 200; however, it is within the scope of the present disclosure that the previously discussed features, variants, etc. may be utilized with the end effector 200.

As seen in FIGS. 5 and 6, the end effector 200 is an example of an end effector 10 whose source 16 of fasteners 14 is a gravity-fed cartridge 56. The end effector 200 comprises an insertion guide 54 supported by the housing 28. As seen in FIG. 6, the positioner 12 of the end effector 200 comprises a rotatable structure 36 coupled to a motor 40. The rotatable structure 36 defines four channels 38 spaced evenly about the rotatable structure 36. The translator 22 of the end effector 200 comprises a linear actuator 42 and an inserter 44. The inserter 44 of the end effector 200 comprises an end region 46 that is configured to operatively engage with collar nuts 62.

Illustrative, non-exclusive examples of inventive subject matter according to the present disclosure are described in the following enumerated paragraphs:

A. An end effector (10), comprising:
a housing (28);
a positioner (12) supported by the housing (28) and configured to sequentially receive fasteners (14) from a source (16) of the fasteners (14) into a receiving position (18) and sequentially move the fasteners (14) from the receiving position (18) to a deploying position (20); and
a translator (22) supported by the housing (28) relative to the positioner (12) and configured to sequentially translate the fasteners (14) from the deploying position (20) to ports (24) of a fastener holder (26).

A1. The end effector (10) of paragraph A1, wherein the housing (28) is configured to be operatively coupled to a robotic manipulator (30).

A2. The end effector (10) of any of paragraphs A-A1, further comprising a sensor (32) supported by the housing (28) and configured to detect presence of a fastener (14) in the receiving position (18).

A2.1. The end effector (10) of paragraph A2, wherein the sensor (32) is a distance sensor.

A2.2. The end effector (10) of paragraph A2, wherein the sensor (32) is a proximity sensor.

A3. The end effector (10) of any of paragraphs A-A2.2, further comprising a controller (34) configured to operatively control the positioner (12) and the translator (22).

A3.1. The end effector (10) of paragraph A3 when depending from paragraph A2,
wherein the controller (34) is configured to receive a signal from the sensor (32) indicating the presence of a fastener (14) in the receiving position (18);
wherein the controller (34) is configured to operate the positioner (12) upon receipt of the signal from the sensor (32); and
wherein the controller (34) is configured to operate the translator (22) following operation of the positioner (12).

A4. The end effector (10) of any of paragraphs A-A3.1, wherein the positioner (12) comprises:
a rotatable structure (36) defining a plurality of channels (38) each configured to receive a fastener (14) and sequentially define the receiving position (18) and the deploying position (20); and
a motor (40) operatively coupled to the rotatable structure (36) and configured to selectively rotate the rotatable structure (36).

A4.1. The end effector (10) of paragraph A4, wherein the motor (40) is a stepper motor.

A5. The end effector (10) of any of paragraphs A-A4.1, wherein the translator (22) comprises a linear actuator (42) supported by the housing (28), aligned with the deploying position (20), and configured to sequentially and linearly translate the fasteners (14) away from the deploying position (20).

A6. The end effector (10) of any of paragraphs A-A5, wherein the translator (22) comprises an inserter (44) configured to operatively engage and mate with a fastener (14) in the deploying position (20).

A6.1. The end effector (10) of paragraph A6, wherein the inserter (44) comprises an end region (46) configured to operatively engage and mate with a fastener (14) in the deploying position (20), and wherein the end region (46) comprises:
an elongate tip (48); and
a rim (50) extending circumferentially around the elongate tip (48), wherein the elongate tip (48) and the rim (50) define a circumferential channel (52) between the elongate tip (48) and the rim (50).

A6.1.1. The end effector (10) of paragraph A6.1, wherein the elongate tip (48) is frustoconical.

A6.1.2. The end effector (10) of any of paragraphs A6.1-A6.1.1, wherein the elongate tip (48) extends beyond the rim (50).

A7. The end effector (10) of any of paragraphs A-A6.1.2, further comprising an insertion guide (54) supported by the housing (28), aligned with the deploying position (20), and configured to operatively guide a fastener (14) into a port (24) of the fastener holder (26).

A8. The end effector (10) of any of paragraphs A-A7, further comprising the fastener holder (26).

A9. The end effector (10) of any of paragraphs A-A8, further comprising the source (16) of the fasteners (14).

A9.1. The end effector (10) of paragraph A9, wherein the source (16) comprises a gravity-fed cartridge (56) supported by the housing (28) to deliver the fasteners (14) to the receiving position (18).

A9.2. The end effector (10) of paragraph A9, wherein the source (16) comprises a pneumatic feed system (58) coupled to the housing (28) and configured to pneumatically deliver the fasteners (14) to the receiving position (18).

A10. The end effector (10) of any of paragraphs A-A9.2, further comprising a/the robotic manipulator (30) operatively coupled to the housing (28).

A10.1. The end effector (10) of paragraph A10, wherein the robotic manipulator (30) comprises a cobot (60).

A11. The end effector (10) of any of paragraphs A-A10.1, wherein the fasteners (14) are collar nuts.

B. A system (11), comprising a plurality of the end effectors (10) of any of paragraphs A-A11, wherein each end effector (10) of the plurality of end effectors (10) is configured to work with a distinct size and/or configuration of fastener (14).

C. A robotic method (100), comprising:
sequentially receiving (102) fasteners (14) from a source (16) of the fasteners (14) into a receiving position (18);

sequentially moving (104) the fasteners (14) from the receiving position (18) to a deploying position (20); and sequentially translating (106) the fasteners (14) from the deploying position (20) to ports (24) of a fastener holder (26).

C1. The robotic method (100) of paragraph C, further comprising:

sequentially sensing (108) the presence of the fasteners (14) in the receiving position (18);

wherein the sequentially moving (104) is performed responsive to the sequentially sensing (108).

C2. The robotic method (100) of any of paragraphs C-C1, wherein the sequentially moving (104) comprises rotating (110).

C3. The robotic method (100) of any of paragraphs C-C2, wherein the sequentially translating (106) comprises linearly translating (112).

C4. The robotic method (100) of any of paragraphs C-C3, wherein the sequentially receiving (102) comprises receiving via gravity (114).

C5. The robotic method (100) of any of paragraphs C-C4, wherein the sequentially receiving (102) comprises pneumatically receiving (116).

C6. The robotic method (100) of any of paragraphs C-C5, wherein the fasteners (14) are collar nuts.

C7. The robotic method (100) of any of paragraphs C-C6, wherein the method (100) is performed by the end effector (10) of any of paragraphs A-A11.

D. Use of the end effector (10) of any of paragraphs A-A11 to fill the ports (24) of the fastener holder (26) with the fasteners (14).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An end effector, comprising:
   a housing;
   a positioner supported by the housing and configured to sequentially receive fasteners from a source of the fasteners into a receiving position and sequentially move the fasteners from the receiving position to a deploying position; and
   a translator supported by the housing relative to the positioner and configured to sequentially translate the fasteners from the deploying position to ports of a fastener holder;
   wherein the positioner comprises:
      a rotatable structure defining a plurality of channels, each configured to receive a fastener and sequentially define the receiving position and the deploying position; and
      a motor operatively coupled to the rotatable structure and configured to selectively rotate the rotatable structure.

2. The end effector of claim 1, wherein the housing is configured to be operatively coupled to a robotic manipulator.

3. The end effector of claim 1, further comprising a sensor supported by the housing and configured to detect the presence of a fastener in the receiving position.

4. The end effector of claim 3, wherein the sensor is a distance sensor.

5. The end effector of claim 3, further comprising a controller configured to operatively control the positioner and the translator, wherein the controller is configured to receive a signal from the sensor indicating the presence of a fastener in the receiving position, wherein the controller is configured to operate the positioner upon receipt of the signal from the sensor, and wherein the controller is configured to operate the translator following operation of the positioner.

6. The end effector of claim 1, wherein the translator comprises a linear actuator supported by the housing, aligned with the deploying position, and configured to sequentially and linearly translate the fasteners away from the deploying position.

7. The end effector of claim 1, wherein the translator comprises an inserter configured to operatively engage and mate with a fastener in the deploying position.

8. The end effector of claim 7, wherein the inserter comprises an end region configured to operatively engage and mate with a fastener in the deploying position, and wherein the end region comprises:
   an elongate tip; and
   a rim extending circumferentially around the elongate tip, wherein the elongate tip and the rim define a circumferential channel between the elongate tip and the rim.

9. The end effector of claim 8, wherein the elongate tip is frustoconical.

10. The end effector of claim 8, wherein the elongate tip extends beyond the rim.

11. The end effector of claim 1, further comprising an insertion guide supported by the housing, aligned with the deploying position, and configured to operatively guide a fastener into a port of the fastener holder.

12. The end effector of claim 1, further comprising the source of the fasteners.

13. The end effector of claim 12, wherein the source comprises a gravity-fed cartridge supported by the housing to deliver the fasteners to the receiving position.

14. The end effector of claim 12, wherein the source comprises a pneumatic feed system coupled to the housing and configured to pneumatically deliver the fasteners to the receiving position.

15. The end effector of claim 1, wherein the fasteners are collar nuts.

16. A system, comprising a plurality of the end effectors of claim 1, wherein each end effector of the plurality of end effectors is configured to work with a distinct size and/or configuration of fastener.

17. A system, comprising the end effector of claim 1 in combination with the fastener holder.

18. A system, comprising the end effector of claim 1 in combination with a robotic manipulator operatively coupled to the housing.

19. The system of claim 18, wherein the robotic manipulator comprises a cobot.

20. A robotic method, comprising:
sequentially receiving fasteners from a source of the fasteners into a receiving position;
sequentially moving the fasteners from the receiving position to a deploying position; and
sequentially translating the fasteners from the deploying position to ports of a fastener holder;
wherein the robotic method is performed by an end effector that comprises:
  a housing;
  a positioner supported by the housing and configured to sequentially receive the fasteners from the source of the fasteners into the receiving position and sequentially move the fasteners from the receiving position to the deploying position; and
  a translator supported by the housing relative to the positioner and configured to sequentially translate the fasteners from the deploying position to the ports of the fastener holder;
wherein the positioner comprises:
  a rotatable structure defining a plurality of channels, each configured to receive a fastener and sequentially define the receiving position and the deploying position; and
  a motor operatively coupled to the rotatable structure and configured to selectively rotate the rotatable structure; and
wherein the sequentially receiving is performed by the positioner, the sequentially moving is performed by the positioner, and the sequentially translating is performed by the translator.

* * * * *